(12) United States Patent
Cury

(10) Patent No.: US 9,429,821 B2
(45) Date of Patent: Aug. 30, 2016

(54) IN-CEILING OR IN-WALL RETRACTING CAMERA PLATFORM SYSTEM

(71) Applicant: EarthCam, Inc., Hackensack, NJ (US)

(72) Inventor: Brian Cury, Hackensack, NJ (US)

(73) Assignee: EARTHCAM, INC., Hackensack, NJ (US)

( * ) Notice: Subject to any disclaimer, the term of this patent is extended or adjusted under 35 U.S.C. 154(b) by 0 days.

(21) Appl. No.: 14/500,143

(22) Filed: Sep. 29, 2014

(65) Prior Publication Data

US 2015/0043902 A1 Feb. 12, 2015
US 2016/0062215 A9 Mar. 3, 2016

Related U.S. Application Data

(63) Continuation of application No. 13/960,148, filed on Aug. 6, 2013, now Pat. No. 8,849,105.

(60) Provisional application No. 61/679,904, filed on Aug. 6, 2012.

(51) Int. Cl.
*G03B 17/00* (2006.01)
*G03B 17/56* (2006.01)
*G03B 17/04* (2006.01)

(52) U.S. Cl.
CPC .............. *G03B 17/561* (2013.01); *G03B 17/04* (2013.01)

(58) Field of Classification Search
USPC ........ 396/7, 12–13, 419, 427, 428; 348/151, 348/373–376
See application file for complete search history.

(56) References Cited

U.S. PATENT DOCUMENTS

| 7,874,744 | B2 | 1/2011 | Cirker | |
|---|---|---|---|---|
| 8,000,588 | B1 | 8/2011 | Harvey | |
| 8,137,009 | B2 * | 3/2012 | Cirker | 396/427 |
| 2009/0185036 | A1 * | 7/2009 | Bowron | 348/151 |

* cited by examiner

*Primary Examiner* — Minh Phan
(74) *Attorney, Agent, or Firm* — Millen, White, Zelano & Branigan, P.C.; William F. Nixon

(57) ABSTRACT

A retractable camera platform system allows a mounted camera to be hidden while not in use. The system retracts a camera platform into a recess in the ceiling, wall and the like of a room, building, hallway or other structure. The system includes the camera platform that opens a door assembly or a cover so that the camera may operate when needed. The door assembly or cover hides the camera and the associated frame structure when not in use. An actuator and linear slide track raise and lower the camera as desired.

11 Claims, 15 Drawing Sheets

IN-CEILING OR IN-WALL RETRACTING CAMERA PLATFORM SYSTEM

This application is a continuation of U.S. patent application Ser. No. 13/960,148, filed Aug. 6, 2013.

FIELD OF THE INVENTION

The present invention relates to a platform for holding a camera and associated devices from a ceiling or a wall. More particularly, the present invention relates to a camera platform integrated with security systems to control the retracting platform as it raises and lowers from a ceiling location.

DESCRIPTION OF THE RELATED ART

Mounted security cameras are prevalent in commercial and home-based security systems. These cameras allow an individual to view several locations within a building at once from a central location. An operator can monitor a premise without having to leave the central location and can watch several places at the same time.

Not everyone, however, wants full-time surveillance of their property. There may be instances where the camera should or must be turned off. For example, most people do not want a camera recording while in their bedroom. The camera may be desired during those times when the homeowner is not present, and off when the homeowner is in the room. A mounted camera may be turned off by the operator or homeowner, but the homeowner may not be totally sure that the camera is off. Purposeful or accidental recording may occur.

Moreover, the aesthetic quality of the room or premises can be impacted by multiple mounted cameras. The cameras may get in the way or be hit by thrown objects, especially if hanging from a ceiling. Thieves also may turn off or compromise the mounted cameras as the cameras are out in the open.

SUMMARY OF THE INVENTION

An in-ceiling retracting camera platform is disclosed that can be integrated into a residential or commercial setting, and linked with a security system to control retracting the platform. When retracted, the camera platform is hidden with the ceiling or wall. A door assembly or cover may open and close to keep the camera platform hidden and to prevent damage to the camera. Further, the camera will not be able to record or take pictures of someone while retracted, so that a user can have true privacy without sacrificing protection.

Thus, a retracting camera system is disclosed. The retracting camera system includes mounting arms attached to a mounting plate. The mounting plate includes a hole therein. The retracting camera system also includes a frame structure fastened to the mounting plate and supported by the mounting arms. The frame structure is configured in a recess. The retracting camera system also includes an actuator and a linear slide track on the frame structure to move a camera. The retracting camera system also includes a door assembly to cover the hole and to allow the camera to exit the recess. The retracting camera system also includes a means for opening the door assembly.

A system is disclosed. The system includes a retractable camera system enclosed within a recess. The retractable camera system includes a camera. The retractable camera system also includes a frame structure to support the camera. The retractable camera system also includes an actuator to move the camera using the frame structure. The retractable camera system also includes a door assembly to close when the camera is in the recess and to open when the camera is in use. The system also includes a device to send a signal to a transceiver connected to the retractable camera system. The actuator moves the camera in response to the signal.

A retractable camera system enclosed within a recess is disclosed. The retractable camera system includes a camera. The retractable camera system also includes a frame structure to support the camera. The retractable camera system also includes an actuator to move the camera using the frame structure. The retractable camera system also includes a door assembly to close when the camera is in the recess and to open when the camera is in use.

BRIEF DESCRIPTION OF THE DRAWINGS

Various other features and attendant advantages of the present invention will be more fully appreciated as the same becomes better understood when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Figure 1:
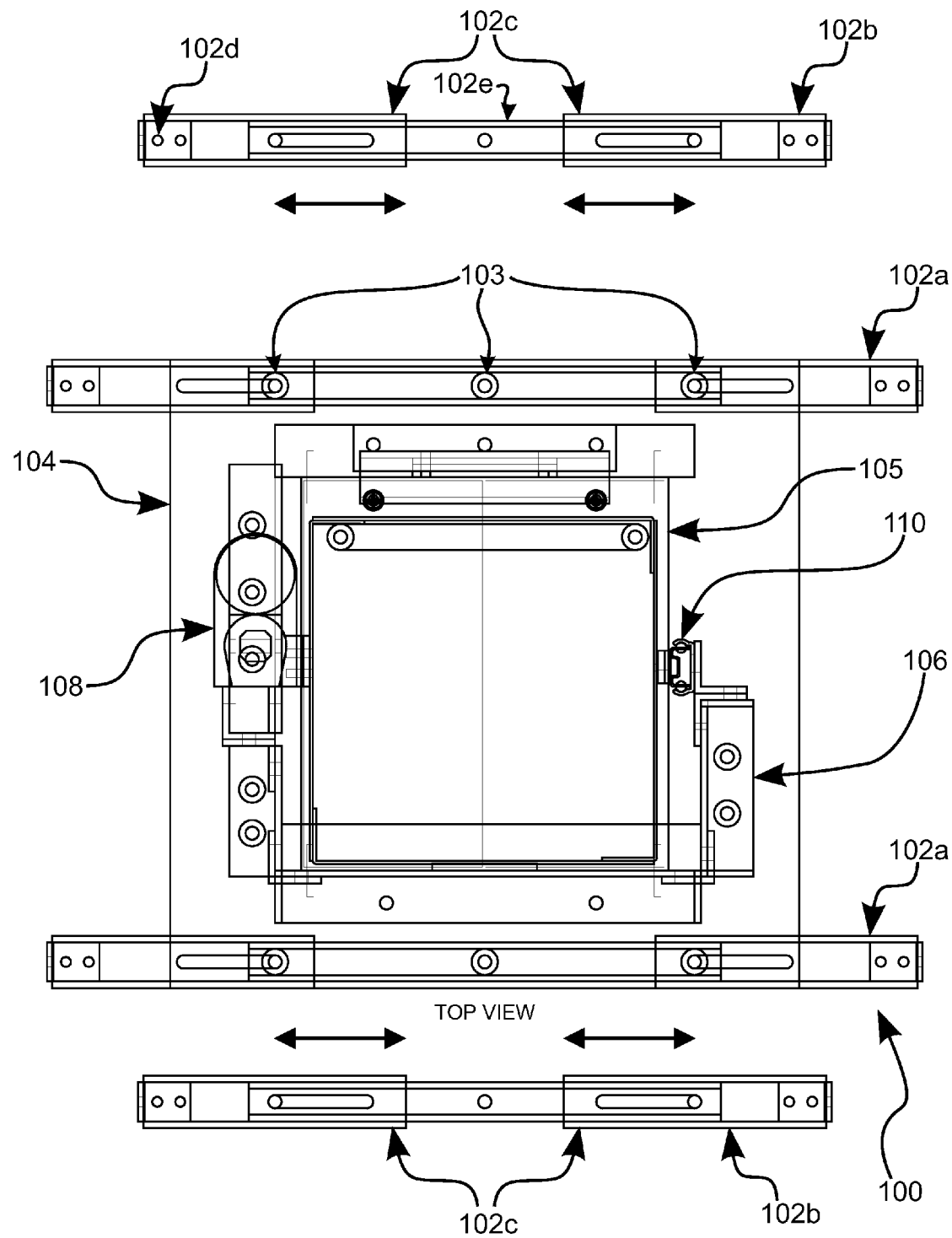
FIG. 1 illustrates a top view of a retractable camera platform system according to the disclosed embodiments.
Figure 2:
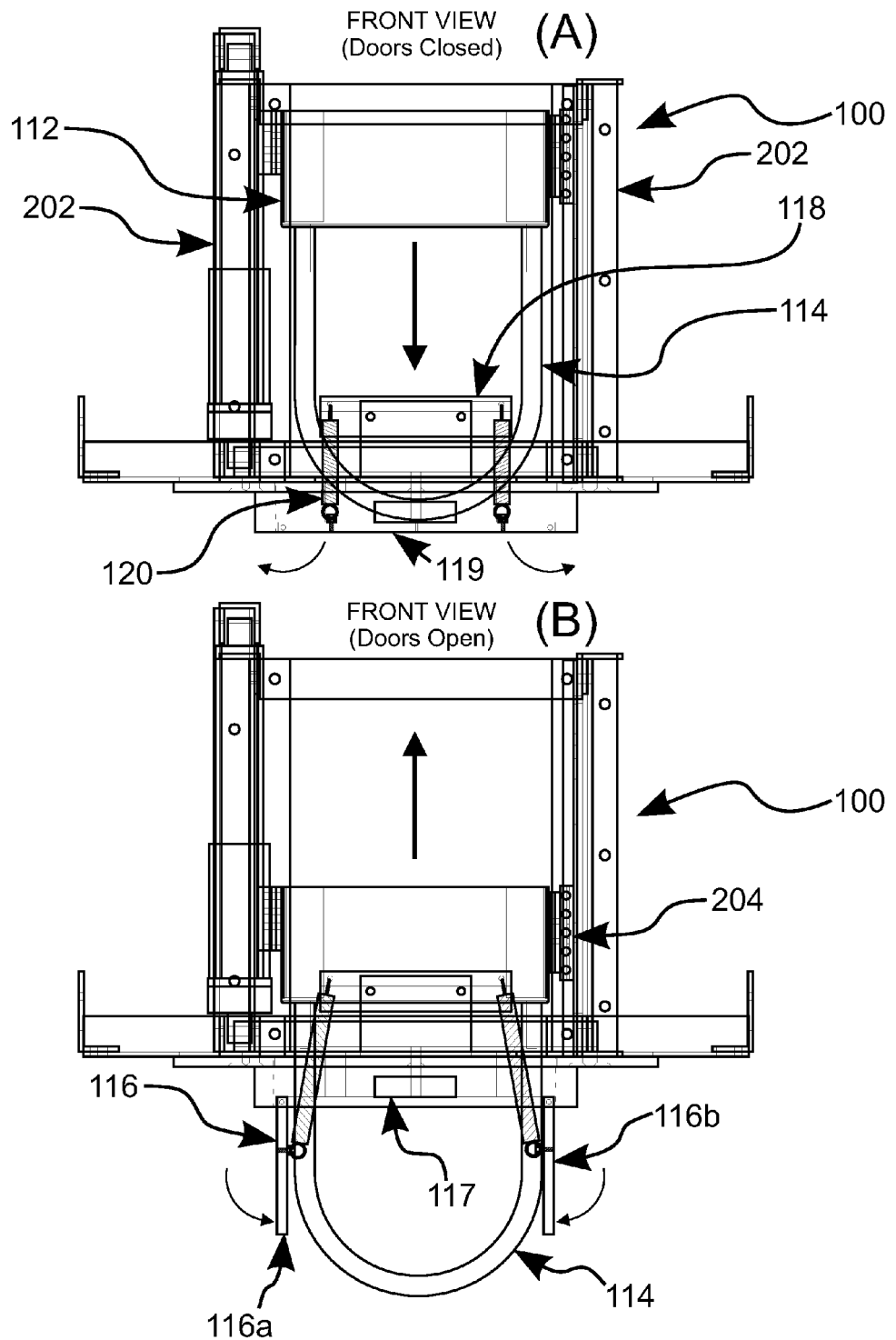
FIGS. 2A-B illustrate front views of the components of the retractable camera platform system according to the disclosed embodiments.

FIG. 1 depicts a top view of a retractable camera platform system 100 and associated components according to the disclosed embodiments. FIGS. 2A-B depict front views of the components of the retractable camera platform system 100 according to the disclosed embodiments. FIG. 2A is a view with the doors closed while retractable camera platform system 102 is retracted while FIG. 2B is a view with system 102 deployed and the doors open. Retractable camera platform system 100 may hold a camera that is linked to a security network to capture and transmit images over the network. Alternatively, the camera may capture and store images at the location of retractable camera platform system 100. The camera may be any small camera system that may fit within platform system 100.

Retracting camera platform system 100 may be integrated into home security systems and wireless/mobile communication systems to control a retracting platform 112 as it raises and lowers from a recess within a ceiling structure. Alternatively, retracting camera platform system 100 may extend and retract into a recess within a wall. The remaining discussion will focus on the ceiling configuration of system 100 but the same principles may apply to a wall-mounted configuration as well. A variety of small to medium sized camera systems may be mounted and integrated onto the retracting platform 112.

Retractable camera platform system 100 is mounted using adjustable mounting arms 102 for securing to different types of ceiling structures. Adjustable mounting arms 102 allow for the fitting of retracting camera platform system 100 into a variety of places. Once installed, adjustable mounting arms 102 may remain fixed. Adjustable mounting arms 102a depict the arm in an extended configuration, such as when retracting camera platform system 100 is installed in a ceiling or other structure.

Adjustable mounting arms 102b depict the arms in a retracted configuration prior to installation in a ceiling structure. Adjustable mounting arms 102 may be fastened in one of these configurations, or in any increment between configurations when mounted in a ceiling structure. Arm 102 includes extendable arms 102c that extend linearly when mounted. Extendable arms 102c slide along inner portion 102e, as shown in FIG. 1. Fasteners 102d on the ends of extendable arms 102c secure arm 102 to extend across a recess in a ceiling, wall or the like. This configuration provides extra stability for retractable camera platform system 100.

Adjustable mounting arms 102 may be machined from 1 inch by 1 inch by 0.125 inch and 0.75 inch by 0.75 inch by 0.125 inch aluminum channel and 2 inch by 1 inch by 0.125 inch aluminum angle. Adjustable mounting arms 102 may be used to mount between parallel support structures preferably spaced between about 13.21 inches to about 16.5 inches apart. These sizes are preferred in the disclosed embodiments as they fit the scale of retracting camera platform system 100 while having adequate size to support system 100 securely in a ceiling. The two sizes of aluminum channels fit together to create a sliding adjustable mounting arm to fit in most, if not all, ceiling or other structures.

Adjustable mounting arms 102 are fastened and locked into position on a plastic base mounting plate 104, preferably comprised of a delrin plastic sheet having a configuration of 12 in by 12 in by 0.25 in. Connectors 103 are used to do so, and may be screws, pins, and the like to secure arms 102 on plate 104. The remaining parts and components of platform system 100 are mounted to mounting plate 104. Plastic base mounting plate 104 may have a rectangular hole 105 cut into its center for the camera to pass through, and is suspended level with the top surface of the ceiling substrate.

A frame structure 106 is machined from a 1 in by 1 in by 0.125 in aluminum angle and a 1 in by 1 in by 0.125 in aluminum channel. Frame structure 106 is fastened to plastic base mounting plate 104 to support a mini-track actuator 108 and a modified linear slide track 110. Actuator 108 and slide track 110 may be mounted opposite each other on either side of plastic base mounting plate 104. Actuator 108 mechanically raises and lowers camera platform 112. Preferably, actuator 108 is an electric actuator. Camera platform 112 may have a square configuration and made from 0.0625 in thick steel sheet metal. Linear slide track, or linear guide track, 110 mounted on the side opposite actuator 108 prevents camera platform 112 from unnecessary twisting during platform or robotic camera operation.

Camera platform 112 is fastened to an aluminum 0.5 inch diameter round stock bar 114, which is bent into a symmetrical U-shape and internally threaded on both ends. U-shaped stock bar 114 may have other dimensions as well, and lowers and rises with camera platform 112. U-shaped stock bar 114 applies force to open a plastic door assembly 116 fastened to plastic base mounting plate 104.

Frame structure 106 includes supports 202 that support the tracks for actuator 108 and slide track 110. Supports 202 may extend vertically from the mounting plate 104. Supports allow camera platform 112 to move vertically to deploy or retract as desired. Rollers 204 slide along slide track 110. Preferably, supports 202 extend into the recess enclosing retractable camera platform system 100.

Plastic door assembly 116 has a stopper 117 in place to prevent doors 116a and 116b from swinging upwards. An aluminum bracket 118 is fastened near the rear of opening 105 in plastic base mounting plate 104 that connects springs 120 that hold tension onto door assembly 116. Springs 120 also hold doors 116a and 116b closed against a stopper 117 in door assembly 116 at 119 when camera platform 112 is retracted.

When camera platform 112 retracts U-shaped bar 114, it also allows door assembly 116 to close due to the tension in springs 120 that are fastened to the door assembly and bracket. Camera platform 112 can deploy and retract when a signal is relayed to system 100 from an integrated control system. A processor may be connected to a receiver to instruct actuator 108 to raise or lower camera platform 112. This feature is disclosed in greater detail below. The processor may execute instructions stored in an accessible memory to perform these processes.

Figure 3A:
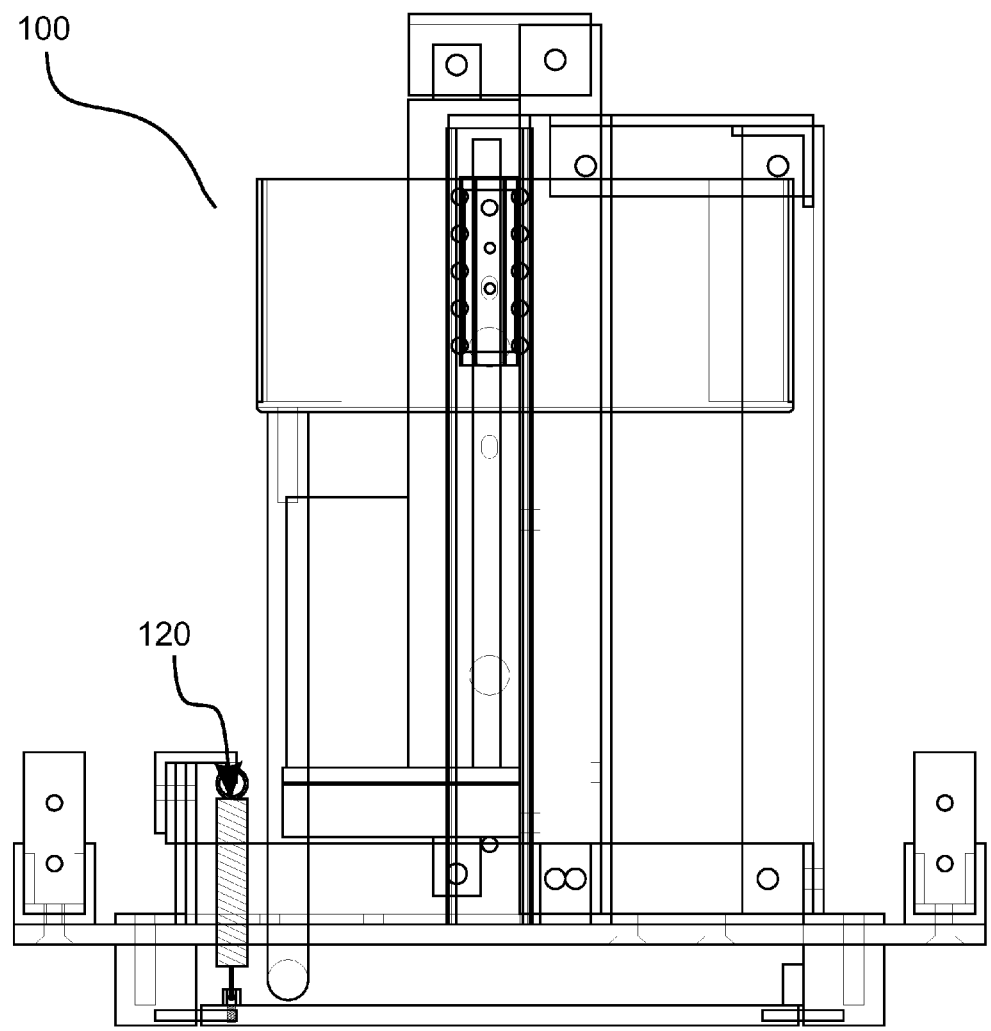
FIGS. 3A-B illustrate side views of the retractable camera platform system according to the disclosed embodiments.
Figure 3B:
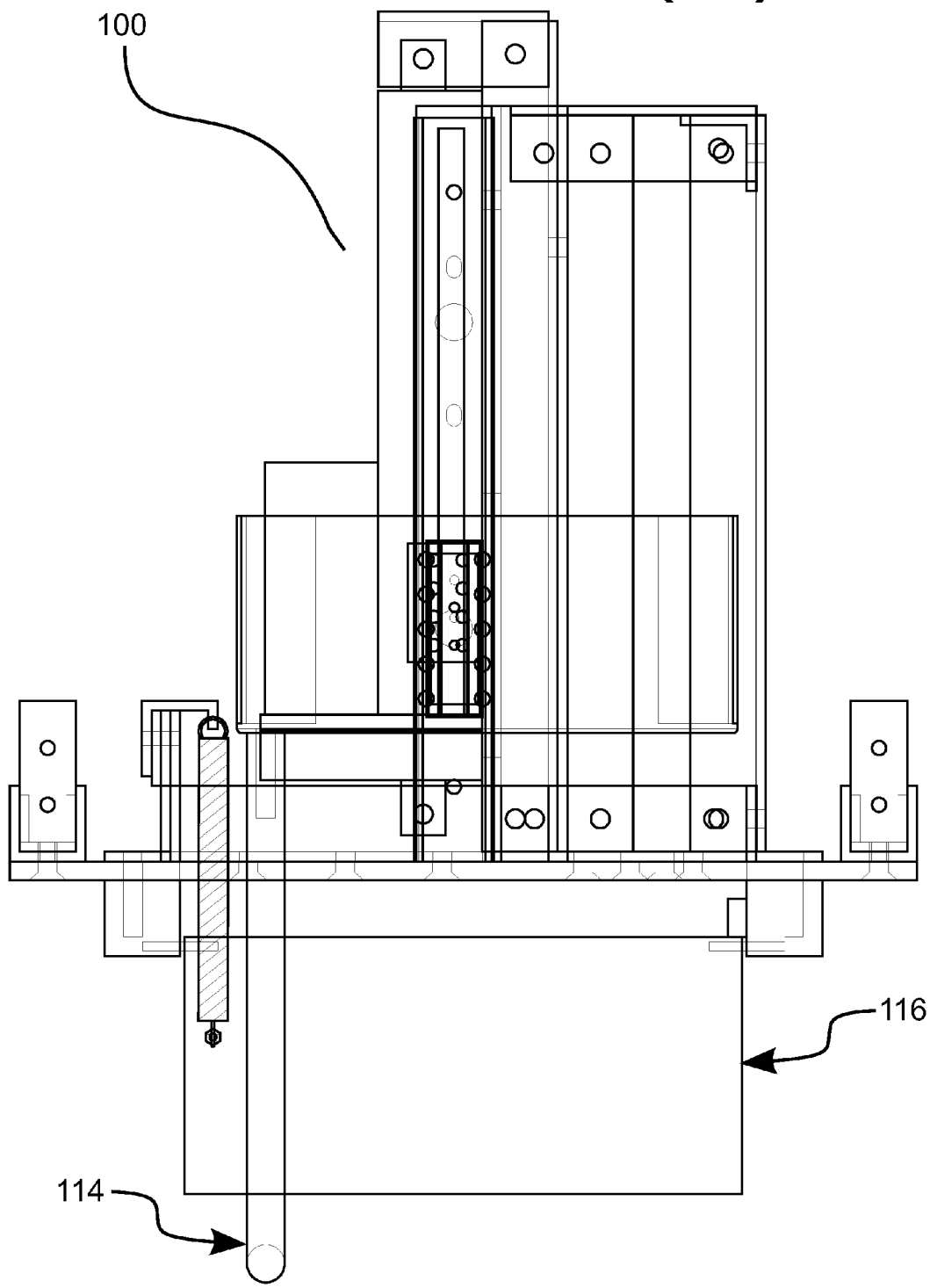

FIGS. 3A-B depict side views of retractable camera platform system 100 according to the disclosed embodiments. FIG. 3A depicts a right side view with door assembly 116 closed and camera platform 112 retracted to hide camera system 100. FIG. 3B depicts a right side view with door assembly 116 open and camera platform 112 lowered to expose the camera. As can be seen, springs 120 extend with door assembly 116 as camera platform 112 is deployed. Bar 114 pushes open door assembly 116. A camera may view the environment and take photos/videos. When bar 114 retracts, springs 120 will move door assembly 116 back to a closed position. When back in the position shown in FIG. 3A, the camera may not take photos/videos, even if instructed to.

Figure 4:
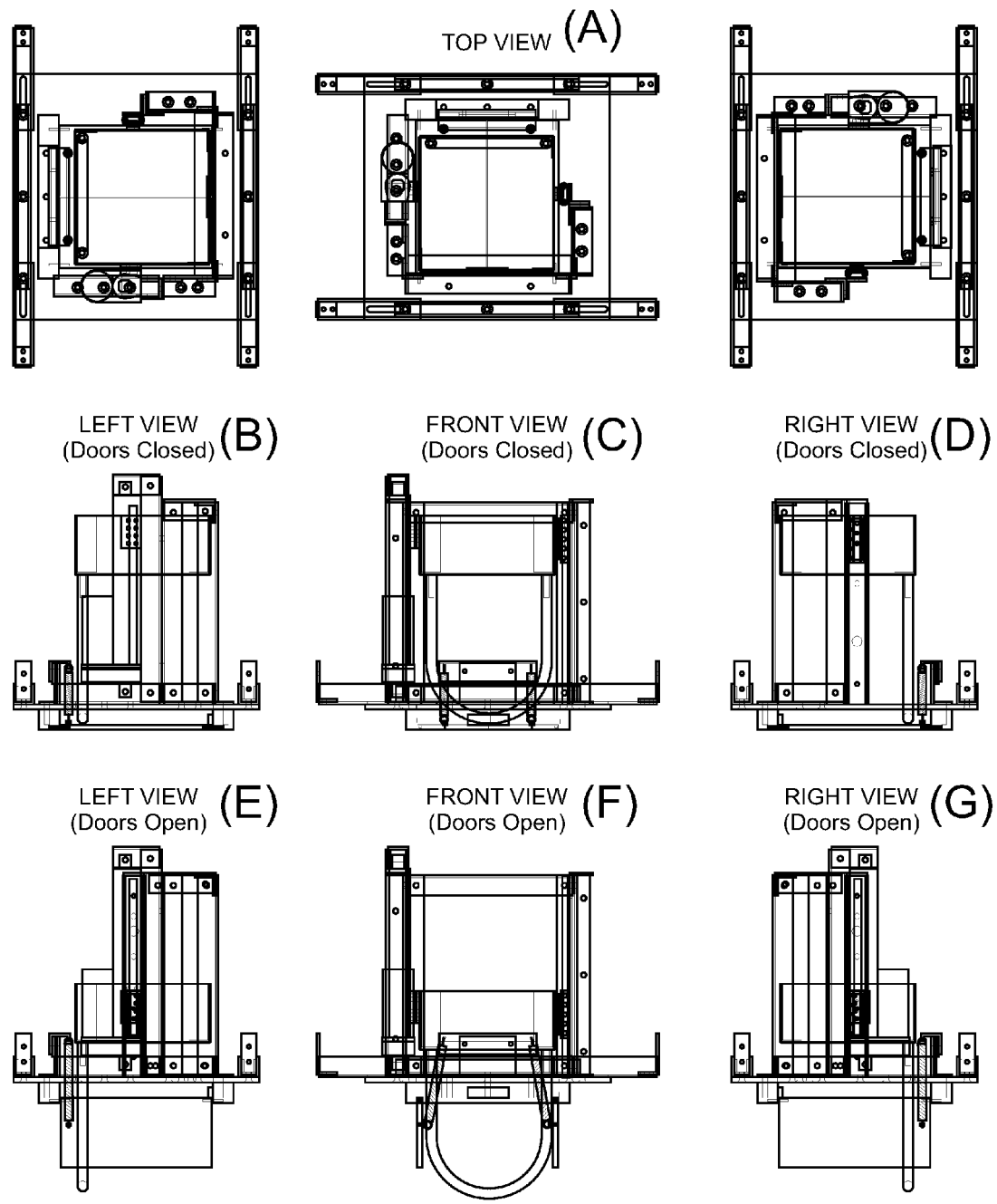
FIGS. 4A-G illustrate views of the retractable camera platform system while open and closed according to the disclosed embodiments.

FIG. 4 depicts views of retractable camera platform system 100 while open and closed according to the disclosed embodiments. FIG. 4A depicts a top view of system 100, similar to FIG. 1. FIGS. 4B, 4C and 4D depict system 100 with camera platform 112 hidden. FIGS. 4E, 4F and 4G depict system 100 with camera platform lowered. Thus, the camera mounted in system 100 may be hidden or in view.

Figure 5:
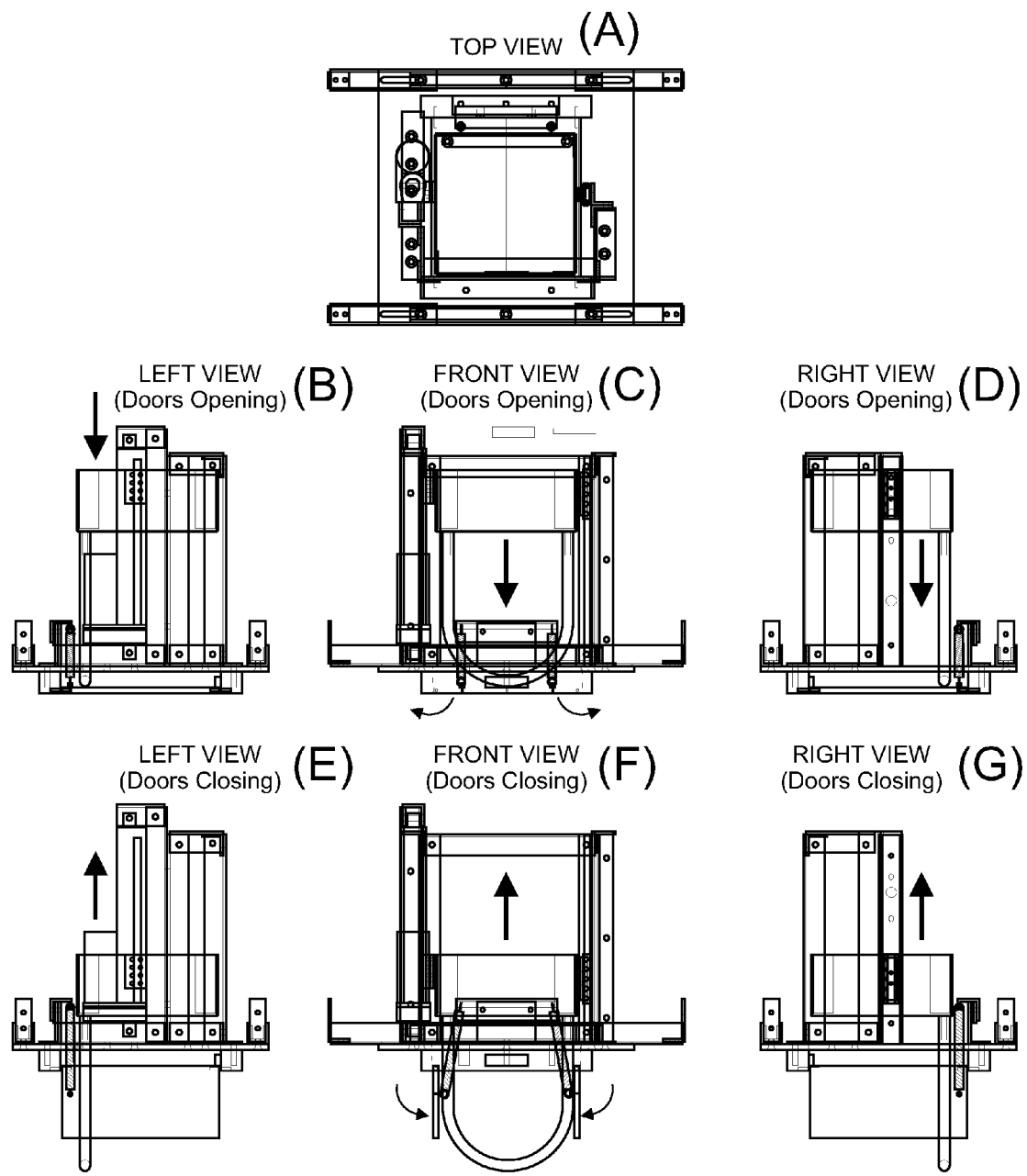
FIGS. 5A-G illustrate views of the retractable camera platform system while opening and closing the doors according to the disclosed embodiments.

FIG. 5 depicts views of retractable camera platform system 100 while opening and closing the doors according to the disclosed embodiments. FIG. 5A depicts a top view of system 100, similar to FIG. 1. FIGS. 5B, 5C and 5D depict system 100 lowering camera platform 112 and opening door assembly 116 by pressing U-shaped bar 114 thereon. FIGS. 5E, 5F and 5G depict system 100 retracting camera platform 112 and closing door assembly 116.

Figure 6:
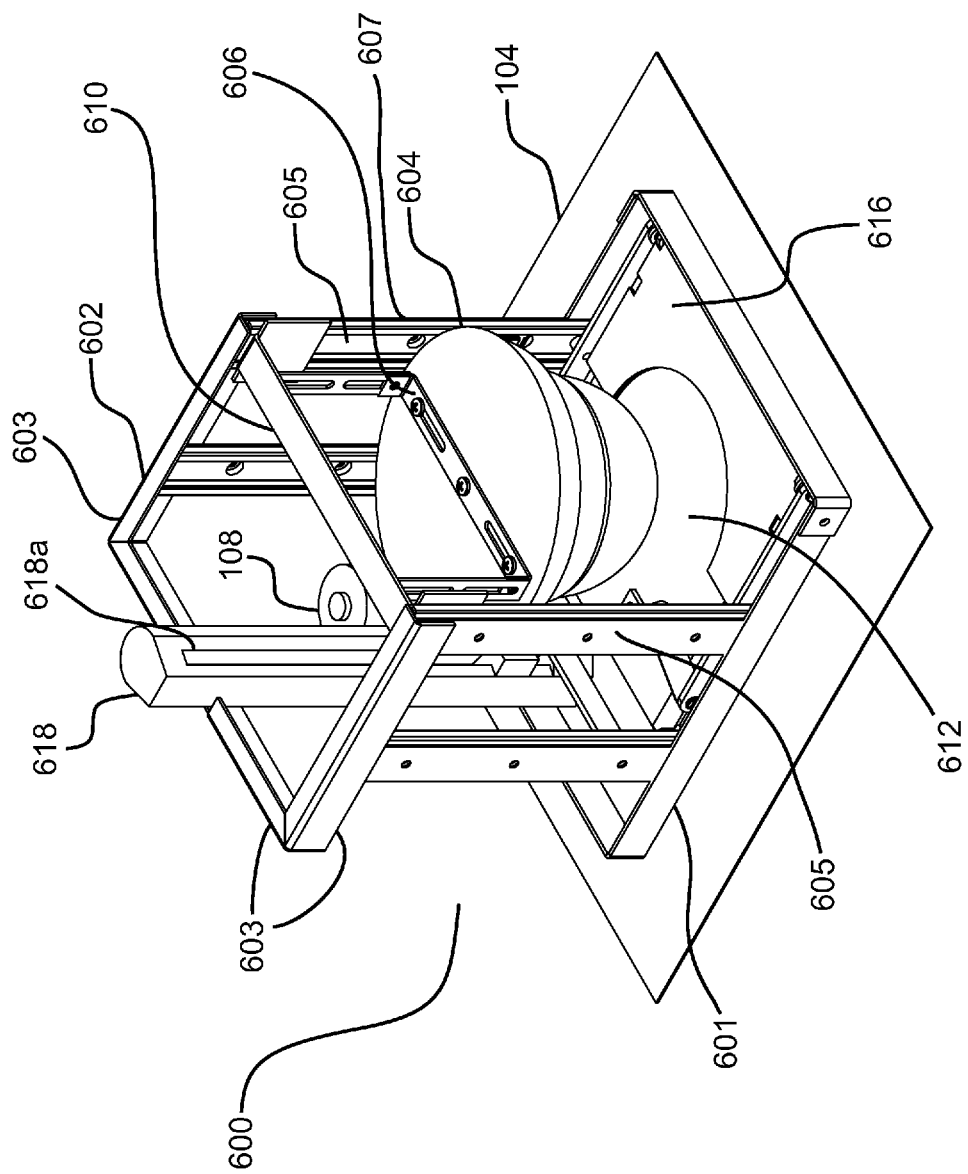
FIG. 6 illustrates a front-right perspective view of another retractable camera platform system according to the disclosed embodiments.
Figure 7:
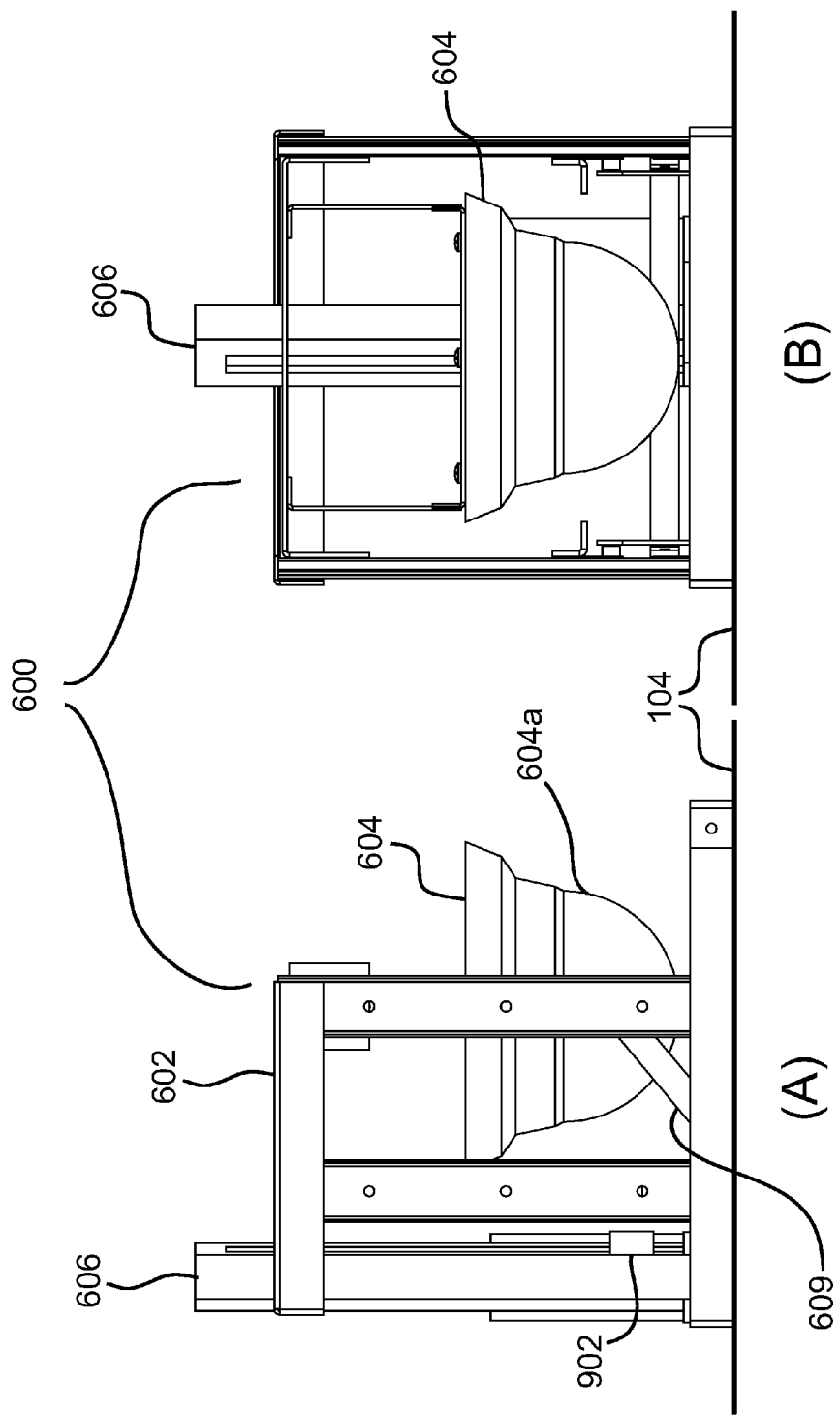
FIG. 7A illustrates a side view of the retractable camera platform system according to the disclosed embodiments.
FIG. 7B illustrates a front view of the retractable camera platform system according to the disclosed embodiments.

FIG. 6 depicts a front-right perspective view of another retractable camera platform system 600 according to the disclosed embodiments. FIG. 7A depicts a side view of retractable camera platform system 600 and FIG. 7B depicts a front view. System 600 is similar to system 100 in that it fits into a recess in a ceiling, wall, enclosure, and the like. The configuration, however, may include several differences, as disclosed below.

Frame structure 602 is connected to base mounting plate 104 using tracks 601. Tracks 601 are connected to and support supports 607, which extend away from mounting plate 104. Supports 607 help move camera 604 within a plane orthogonal to mounting plate 104. Preferably, frame structure 602 includes four supports 607, with two of the supports housing tracks 605. Camera 604 may move along tracks 605. Thus, if system 600 is enclosed within a ceiling, then it moves camera 604 vertically to deploy or retract.

Linear actuator 108 moves camera 604. Linear actuator 108 may move connector 902 in a groove 618a of support 618. It does so differently than system 100, and is disclosed in greater detail below. Upper supports 603 provide additional support for camera 604 and encase system 600. Upper bar 610 is connected to camera 604 with connector bars 606. As shown, connector bars 606 include a U-shaped configuration with one bar directly attached to camera 604.

Door assembly 616 includes partitions and a cover 612. Cover 612 prevents camera 604 from being seen when it is retracted. Cover 612 moves using movable bars 609, disclosed below. Cover 612 is connected to movable connector 902 that moves within groove 618a. Movable connector 902 moves in response to actuator 108. Thus, as shown in FIG. 9, when cover 612 is drawn up support 618, then camera 604 is able to deploy through the aperture created by door assembly 616.

Figure 8:
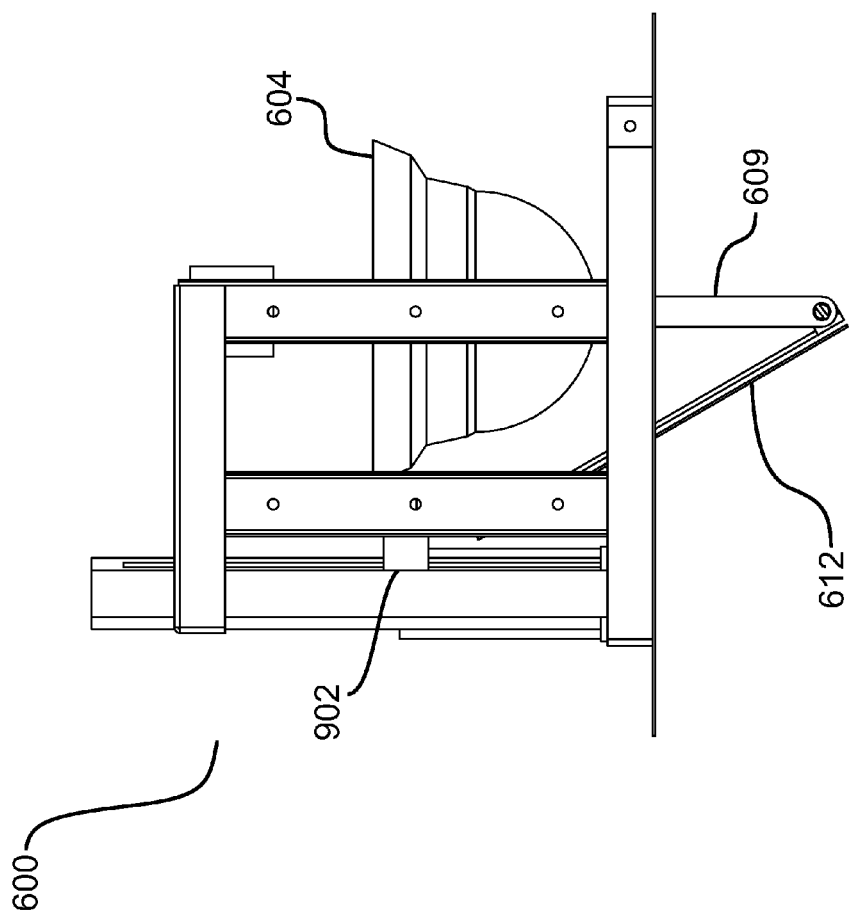
FIG. 8 illustrates a side view of the retractable camera platform system while opening or closing according to the disclosed embodiments.

Camera 604 moves along tracks 605 using upper bar 610. FIG. 8 depicts retractable camera platform system 600 while it is moving or being deployed according to the disclosed embodiments. As shown, movable bars 609 extend outwardly from mounting plate 104 to rotate into a new position. Cover 612 is connected to linear actuator 108 via connector 902. As the connector moves upward, it pulls cover 612 up with it. Cover 612 is on pivots with movable bar 609, which is connected to linear carriages in rails of tracks 601.

Camera 604 is deployed through the opening left from the movement of cover 612. Door assembly 616 surrounds camera 604, as shown in FIG. 9. FIG. 9 depicts system 600 in a deployed state. FIGS. 10A and 10B also show different views of deployed system 600. Movable bars 609 are in a different position than in the retracted state. A partition of door assembly 616 may be moved forward as cover 612 is moved upwards with actuator 108.

Figure 9:
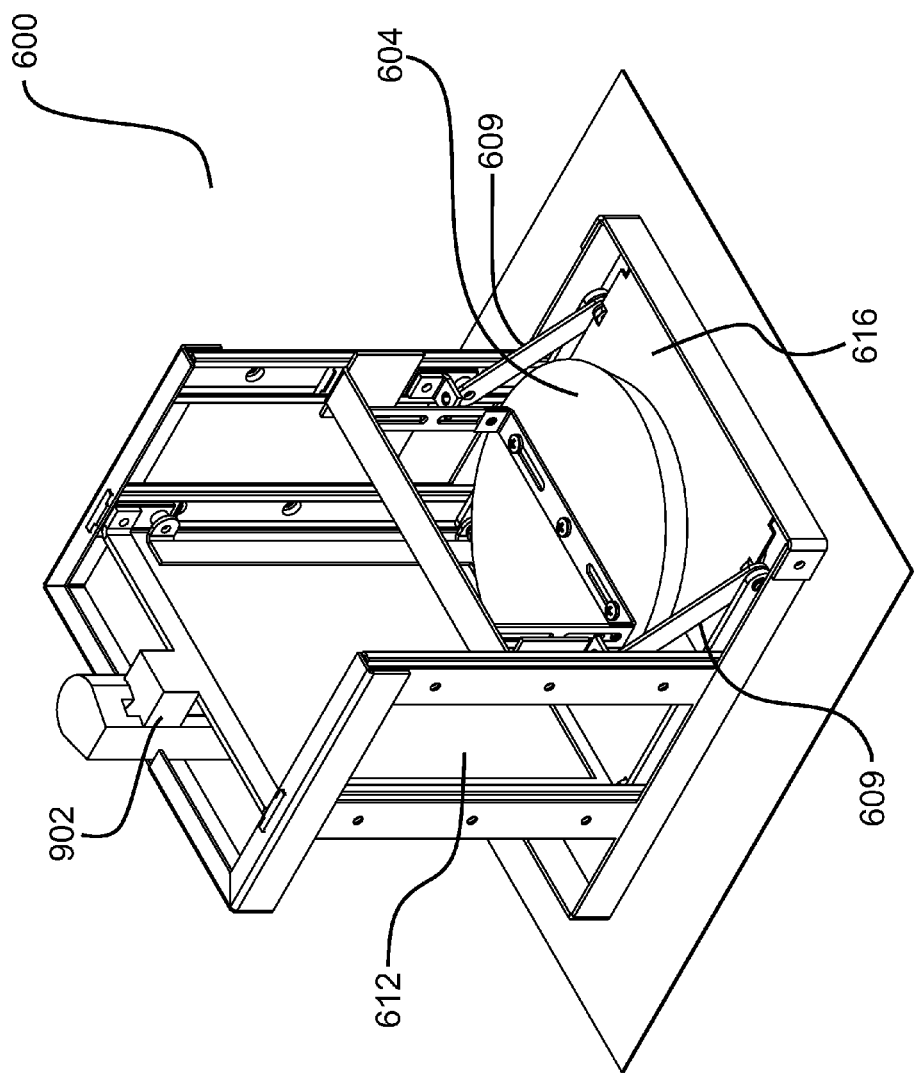
FIG. 9 illustrates a front-right perspective view of the deployed retractable camera platform system according to the disclosed embodiments.
Figure 10:
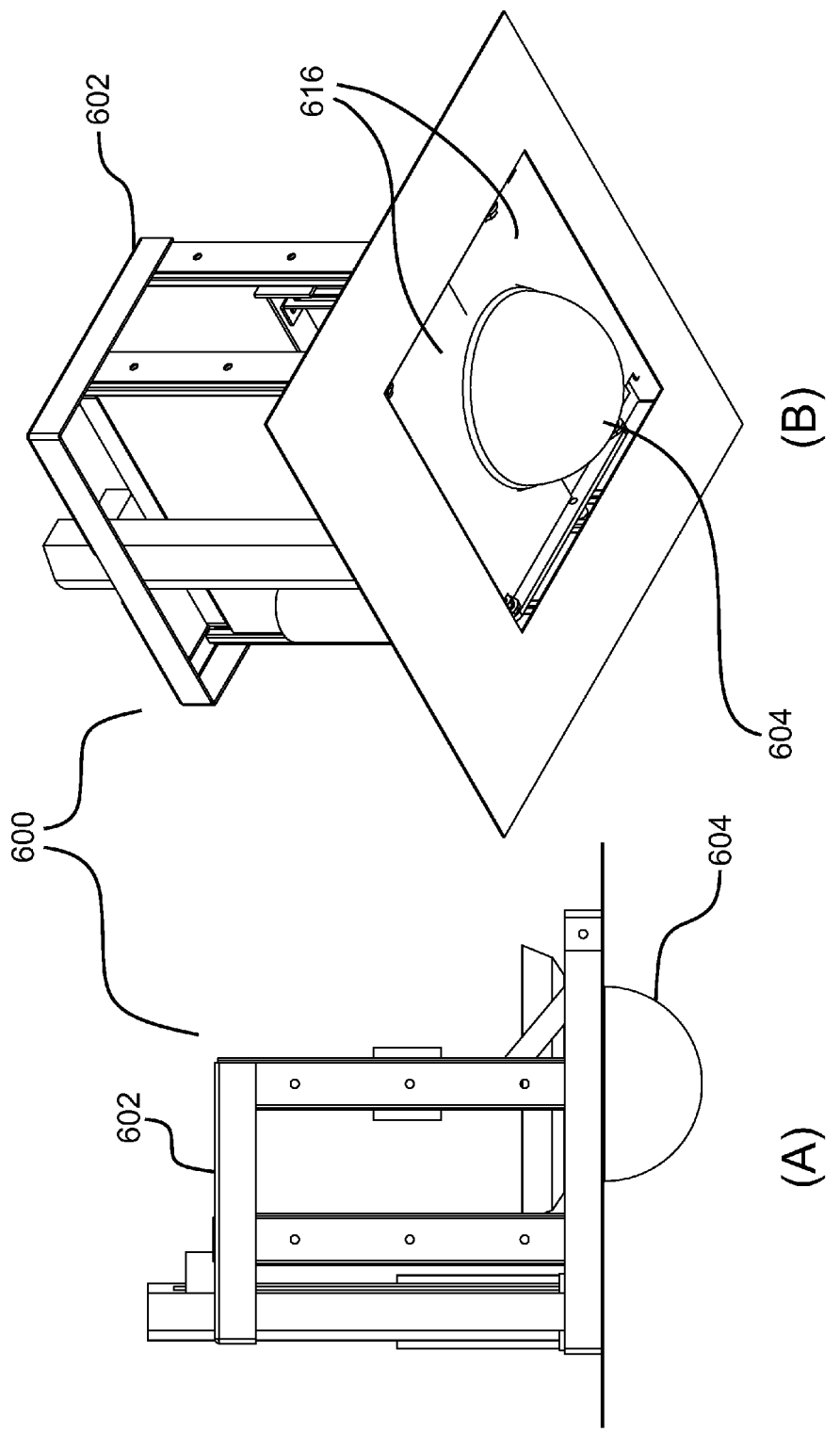
FIG. 10A illustrates a side view of the deployed retractable camera platform system according to the disclosed embodiments.
FIG. 10B illustrates a bottom-left perspective view of the deployed retractable camera platform system according to the disclosed embodiments.

As can be seen in FIGS. 9, 10A and 10B, camera 604 is visible outside the recess enclosing system 600. Thus, camera may be subtle. Unlike system 100, system 600 provides an element of stealth by not apparently being a camera brought out to monitor or take pictures. Camera 604, due to the configuration of system 600, may be a rotatable camera to provide a full 360 degree viewing area, as well as rotating on an X axis and Y axis. Camera 604 includes a dome 604a. No platforms or doors may obstruct the view of camera 600 in this configuration.

Figure 11:
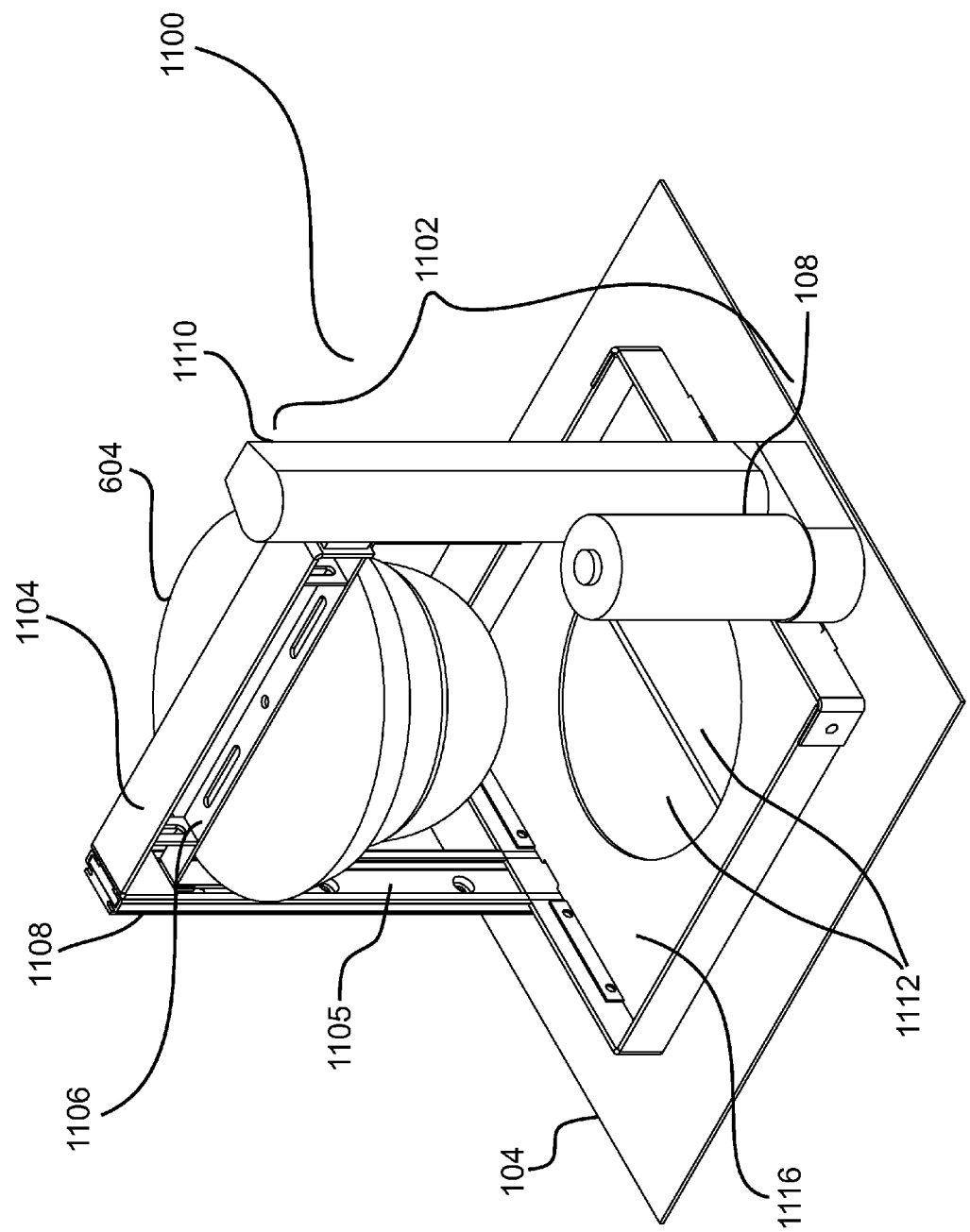
FIG. 11 illustrates a front-left perspective view of another retractable camera platform system according to the disclosed embodiments.

FIG. 11 depicts a front-left perspective view of another retractable camera platform system 1100 according to the disclosed embodiments. Camera 604 again is a full view camera providing views from different angles and positions. As with system 600, system 1100 is supported by mounting plate 104. Frame structure 1102 supports camera 604 and moves it to retract or deploy for use.

Frame structure 1102 includes supports 1108 and 1110. Support 1108 encloses track 1105. Support 1110 operates with actuator 108 to move camera 604. A groove within support 1110 may provide the track to allow a connector, like connector 902, to move. Upper bar 1104 and connecting bar 1106 attach to camera 604 and move within track 1105 and the groove in support 1110.

Cover 1116 may be located in the rectangular aperture within mounting plate 104. Doors 1112 may be located underneath cover 1116, and open to allow camera 604 to deploy outside frame structure 1102.

Figure 12:
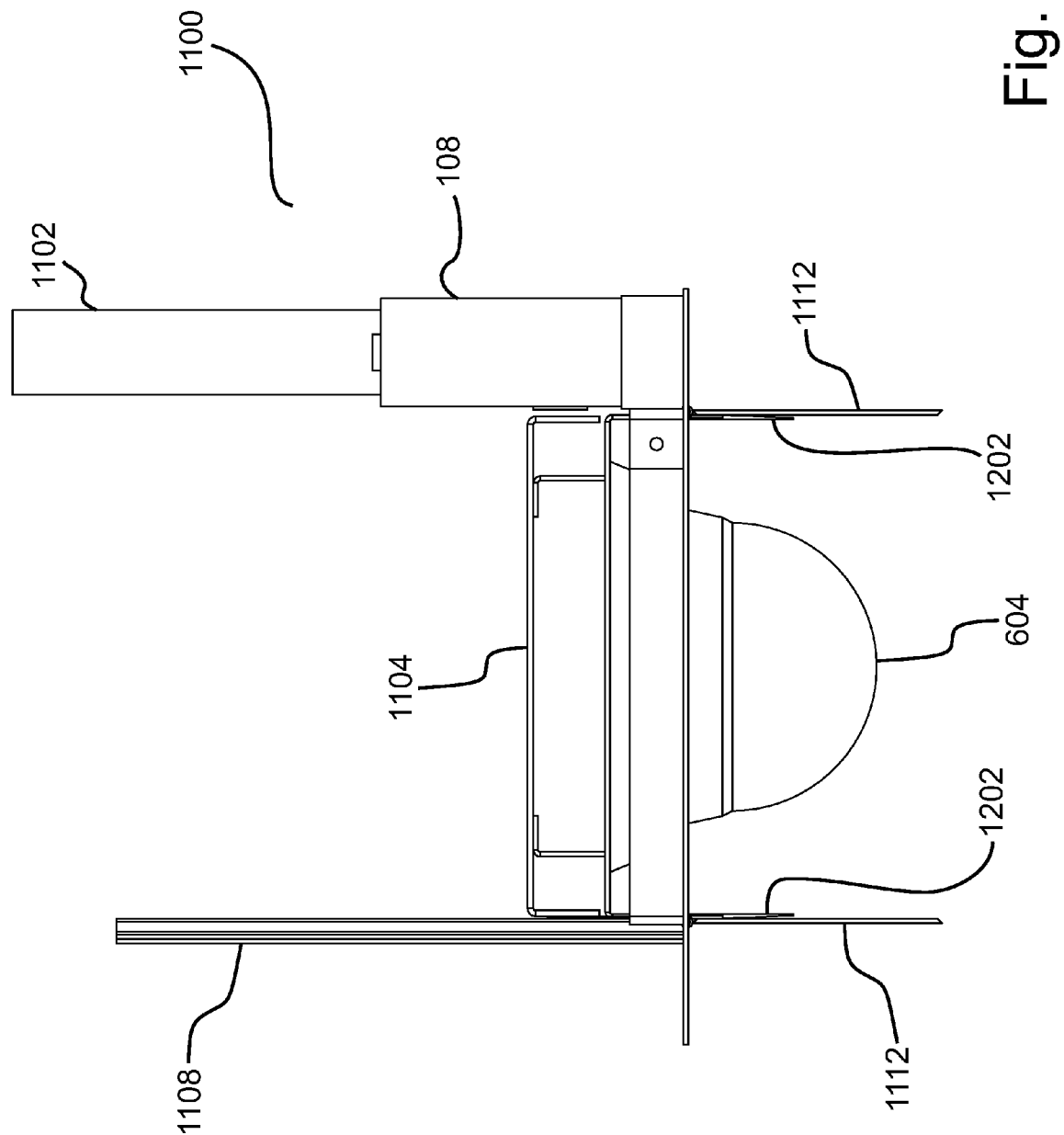
FIG. 12 illustrates a side view of the deployed retractable camera platform system according to the disclosed embodiments.
Figure 13:
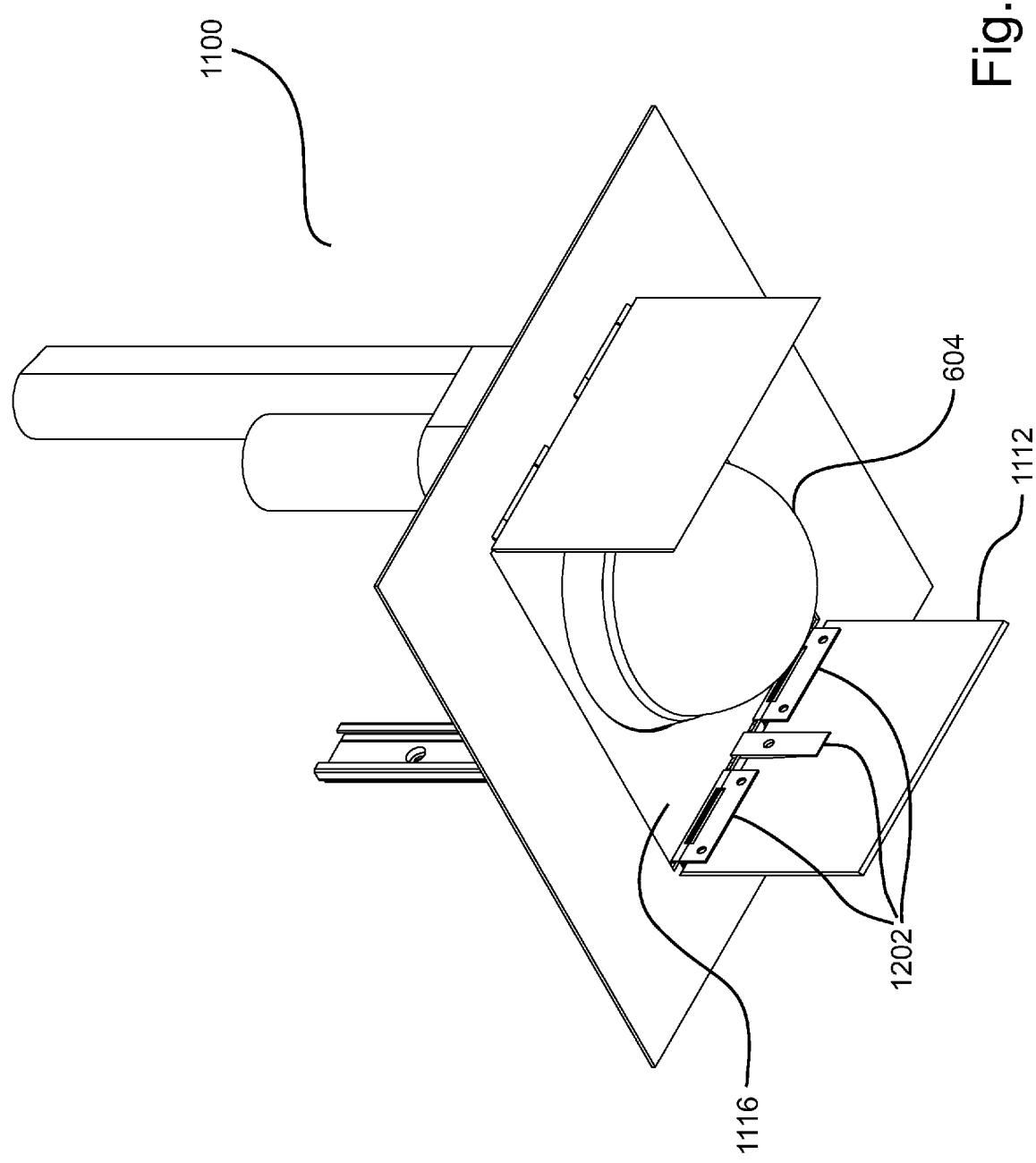
FIG. 13 illustrates a bottom-left perspective view of the deployed retractable camera platform system according to the disclosed embodiments.

FIG. 12 depicts a front view of retractable camera platform system while deployed, or in use, 1100 according to the disclosed embodiments. FIG. 13 depicts a bottom-left perspective view of retractable camera platform system 1100 while deployed according to the disclosed embodiments. Camera 604 moves in conjunction with actuator 108 to open doors 1112. Hinges 1202 are attached to doors 1112 to open them. Hinges 1202 include torsion springs that keep doors 1112 normally closed. As camera 604 is lowered, the dome of the camera and tabs on either side forces open doors 1112.

Camera system 1100 may provide a simpler structure than camera system 600. System 1100 may be applicable for spaces or recesses not quite as large as other systems. System 1100 also may be more applicable for ceiling configurations to lower and retract camera 604.

Figure 14:
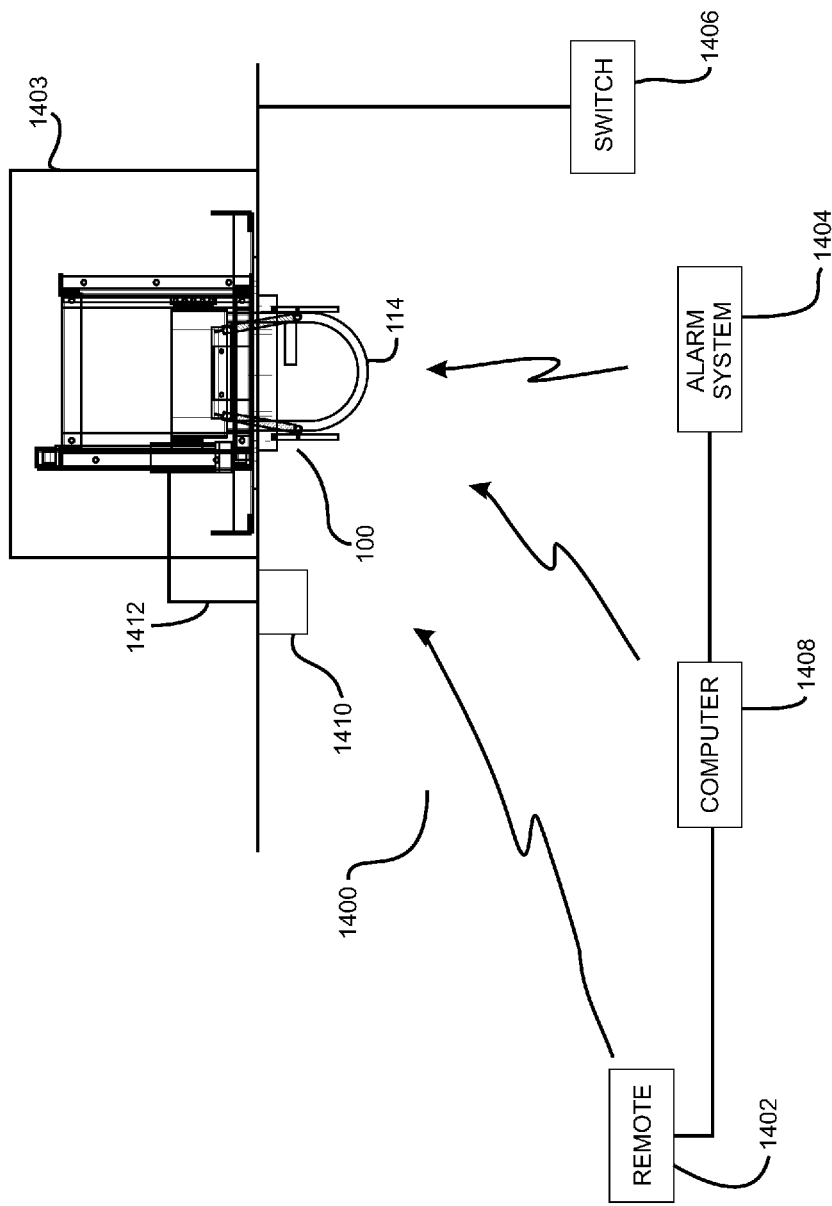
FIG. 14 illustrates a block diagram of a system using the retractable camera platform system according to the disclosed embodiments.

FIG. 14 depicts a block diagram of a system 1400 using the retractable camera platform system according to the disclosed embodiments. Although the retractable camera platform system is designated as 100, the other systems (600 and 1100) and their equivalent embodiments also may be incorporated into system 1400.

System 1400 shows how the camera systems disclosed above interact with other components. The disclosed embodiments are not limited to the components disclosed in FIG. 14, and additional components may be used to deploy and retract a camera as needed. System 1400 may be a wireless network. Alternatively, system 1400 may include wired and wireless components that communicate with camera system 100.

Preferably, system 1400 includes retractable camera platform system 100 enclosed within a recess 1403. Recess 1403 may be located within a ceiling, wall, and the like. Alternatively, recess 1403 may be located outside of a building, in the ground, or anyplace that recess 1403 may be built. Also preferably, recess 1403 encloses the frame structure of the applicable camera system installed. Although shown as a block shape, recess 1403 may be any shape desired or required.

Camera system 100 deploys and retracts to allow a camera to view the area of interest. In the embodiment shown, U-shaped bar 114 opens door assembly 116 to allow platform 112 to lower. Camera system 100 is instructed to do so by a variety of processes. Examples of these processes are disclosed below.

Switch 1406 may be coupled to camera system 100 so that a user turns the switch "on" to deploy the camera for operations. Switch 1406 may configured to directly connect with actuator 108 to operate camera system 100. When switch 1406 is turned into an "off" state, then the camera is retracted back into recess 1403. This configuration allows the camera system to be used and taking pictures/video when requested. The user determines the level of privacy desired. Switch 1406 may include a timer control so that the camera is retracted after a specified period of time, in case the user forgets to turn off the switch. Switch 1406 may be a push button switch, single pole switch, and the like. Multiple camera systems may be coupled to switch 1406, and a plurality of switches may control a single camera system. Switch 1406 also may be variable, so that the camera is lowered, or deployed, for certain distance from recess 1403. Alternatively, switch 1406 may be wirelessly connected to camera system 100 through system 1400.

Camera system 100 also may react to signals or instructions received from devices connected wirelessly or wired to system 1400. Examples of such devices are shown in FIG. 14. A wireless transceiver 1410 may receive a signal from remote 1402, computer 1408 or alarm system 1404 to deploy or retract, and use, camera system 100. Transceiver 1410 may exchange information with these devices over a wireless network. The network may be a local area network, such as in a home, or a large network, such as those supported by wireless data companies. Transceiver 1410 also may send information to devices connected to the network to provide status or updates to a user. Connection 1412 may receive a signal from transceiver 1410 to activate actuator 108. Transceiver 1410 is shown separate from camera system 100, but it may be incorporated into system 100. Further, transceiver 1410 may be located within its own recess so that it is not readily visible to an observer.

Remote 1402 may be a handheld device used by one to deploy or retract camera system 100. Remote 1402 may be carried by the user. Remote 1402 also may be a smartphone, or other device running an application that allows the device to communicate within system 1400. Remote 1402 may issue different commands to camera system 100 beyond just deploy and retract. The user may indicate a period of time that camera system 100 is deployed. Remote 1402 also may include a sensor that detects conditions to deploy camera system 100.

Computer 1408 also may communicate with camera system 100 via system 1400. Computer 1408 may differ from remote 1402 in that it provides more robust functionality and control. Computer 1408 includes a processor, memory for storing instructions used by the computer to provide functions, input/output ports, and the like. Computer 1408 may store images or video generate by camera system 100 for future reference or backup. The user may open a window or program to set up the sending of commands to computer system 100 according to specified criteria or conditions.

For example, an application running on computer may provide a graphical user interface to set times for camera system 100 to deploy and be in use, such as evening hours for a business. The application also may include conditions that trigger camera system 100 to act, such as when computer 1408 is turned off. A user may have camera system 100 deploy when the computer shuts down, and it is assumed that no one is in the immediate area. Computer 1408 also may be wired to alarm system 100, much like switch 1406.

Alarm system 1404 provides additional functionality to system 1400. When an emergency condition is detected, alarm system 1404 sends a signal for camera system 100 to deploy. During non-emergency conditions, privacy is maintained. The only time to record images is when something has occurred, and a user/computer may not be capable of sending a signal to camera system 100. Alarm system 1404 may include sensors or other means of compiling data to indicate a condition to deploy camera system 100, such as going onto auxiliary power, high temperature, loud noises and the like. Alarm system 1404 performs conventional alarm or warning functions, and sends a signal to transceiver 1410. Alternatively, alarm system 1404 may be wired directly to camera system 100 in the event system 1400 goes down.

Thus, a camera system with added functionality is disclosed. The disclosed system allows a user, company, authority, maintenance and the like to maintain privacy by keeping the camera system within a recess until needed. Upon receiving an instruction to record an image, the camera system exits the recess using a frame structure to move the camera out into the open. A cover, doors or door assembly is moved in conjunction with the camera to allow deployment. Otherwise, these items cover a hole created for the camera to keep it hidden or out of view.

This feature especially is important for security measures. When retracted out of view, the camera is not readily discernible. An intruder would not be aware of its presence, unlike fixed cameras out in the open. The frame structure allows an actuator to move the camera with the need for large bulking motors or assemblies. Thus, the camera is lowered for use without causing distraction or attention to itself. Using the intruder example, the camera may be deployed without notice to capture images of the intruder. The intruder may not disable the camera because he does not know about it.

It will be readily apparent to those skilled in the art that various modifications can be made in the disclosed embodiments of the camera system without departing from the spirit or the scope of the invention. Thus, it is intended that the present disclosure covers any modifications or variations of the embodiments disclosed herein provided that the modifications and variations come within the scope of the claims and their equivalents.

The invention claimed is:

1. A system comprising:
   a retractable camera system enclosed within a recess including a camera,
   a frame structure having at least one support to support the camera housed within the recess and connected to a mounting plate using a plurality of support tracks,
   a plurality of mounting arms to support the frame structure using the mounting plate, wherein the plurality of mounting arms is configured to be mounted to a ceiling,
   an actuator to move the camera using a linear slide track supported by the support tracks of the frame structure, wherein the linear slide track is perpendicular to the support tracks of the frame structure,
an upper bar connected to the linear slide track and the support and configured to move within the linear slide track, wherein the upper bar includes a connecting bar attached to the camera, and
a door assembly to dose when the camera is located in the recess and to open when the camera is outside of the recess; and
a wireless transmission device to send a signal to a transceiver connected to the retractable camera system, wherein the actuator moves the camera in and out of the recess in response to the signal.

2. The system of claim 1, wherein the wireless transmission device is activated by an alarm system, and the signal is sent in response to a condition detected by the alarm system.

3. The system of claim 1, wherein the wireless transmission device is connected to a computer.

4. The system of claim 1, further comprising a wireless network configured to transmit the signal to the retractable camera system.

5. The system of claim 1, further comprising a means for opening the door assembly.

6. The system of claim 1, wherein the recess is within a ceiling.

7. The system of claim 1, wherein the wireless transmission device is within a remote control device.

8. The system of claim 1, wherein the mounting arms of the plurality of mounting arms are adjustable.

9. A retractable camera system enclosed within a recess comprising:
a camera;
a frame structure, housed within the recess in a ceiling, to support the camera to a mounting plate and having linear slide tracks to move a platform holding the camera, wherein the linear slide tracks are supported by support tracks connected to the mounting plate and attached to move the platform perpendicularly to the mounting plate;
a plurality of mounting arms to support the mounting plate for the frame structure;
an actuator to move the camera using the linear slide tracks of the frame structure to move a connector within a support of the frame structure;
a cover to close when the camera is located within the recess and to open when the camera is outside of the recess, wherein the camera is hidden when not in use, wherein the cover is attached to the connector and moves therewith; and
a wireless transceiver to receive a signal directly from a device to activate the actuator to move the platform along the linear slide tracks.

10. The retractable camera system of claim 9, further comprising a switch coupled to the actuator.

11. The system of claim 9, wherein the mounting arms of the plurality of mounting arms are adjustable.

* * * * *